United States Patent
Jang

(10) Patent No.: US 7,518,773 B2
(45) Date of Patent: Apr. 14, 2009

(54) LIGHT SCANNING SYSTEM AND IMAGE FORMING APPARATUS EMPLOYING THE SAME

(75) Inventor: Kyung-nam Jang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 234 days.

(21) Appl. No.: 11/541,648

(22) Filed: Oct. 3, 2006

(65) Prior Publication Data

US 2007/0091403 A1 Apr. 26, 2007

(30) Foreign Application Priority Data

Oct. 14, 2005 (KR) ...................... 10-2005-0096965

(51) Int. Cl.
*G02B 26/08* (2006.01)
(52) U.S. Cl. ..................................... 359/212
(58) Field of Classification Search ................. 359/196, 359/212–214, 216, 872
See application file for complete search history.

(56) References Cited

U.S. PATENT DOCUMENTS

2004/0263937 A1* 12/2004 Fujii et al. .................. 359/212

FOREIGN PATENT DOCUMENTS

| JP | 09-230278 | 9/1997 |
|---|---|---|
| JP | 2001-021824 | 1/2001 |
| JP | 2002-082303 | 3/2002 |
| JP | 2002-182147 | 6/2002 |
| JP | 2004-279544 | 10/2004 |
| KR | 1020030069857 | 8/2003 |

* cited by examiner

*Primary Examiner*—Euncha P Cherry
(74) *Attorney, Agent, or Firm*—Roylance, Abrams, Berdo & Goodman, L.L.P.

(57) ABSTRACT

A light scanning system is provided that includes a light source unit emitting light, and a light deflector having a sinusoidally vibrating deflecting surface that deflects and scans the light emitted from the light source unit. When the deflecting surface is positioned to direct light to the center of a scan range, the maximum deflection angle $\Phi_0$ of the deflecting surface satisfies $20° \leq \Phi_0 \leq 25°$.

20 Claims, 8 Drawing Sheets

LIGHT SCANNING SYSTEM AND IMAGE FORMING APPARATUS EMPLOYING THE SAME

CROSS-REFERENCE TO RELATED PATENT APPLICATION

This application claims the benefit under 35 U.S.C. § 119 (a) of Korean Patent Application No. 10-2005-0096965, filed on Oct. 14, 2005, in the Korean Intellectual Property Office, the entire disclosure of which is hereby incorporated by reference.

BACKGROUND OF THE INVENTION

1. Field of the Invention

The present invention relates to a light scanning system and an image forming apparatus employing the same. More particularly, the present invention relates to a light scanning system having a sinusoidally vibrating deflecting surface and an image forming apparatus employing the light scanning system.

2. Description of the Related Art

Light scanning systems, such as laser scanning units (LSUs), are applied to image forming apparatuses for printing an image on paper, such as copiers, printers or facsimiles. Light scanning systems form an electrostatic latent image by scanning light emitted from a light source, such as a semiconductor laser, onto a photosensitive medium of an image forming apparatus using a video signal. An image is produced by transferring the electrostatic latent image formed on the photosensitive medium to a medium, such as a sheet of paper.

Light emitting systems include a light deflector that scans a laser beam emitted from a laser beam source at a constant speed.

Generally, light scanning systems employ as a light deflector a rotating polygonal mirror that horizontally scans an incident laser beam at a constant linear speed by rotating and reflecting the laser beam. An f-θ lens is used as an image-forming lens so that the rotating polygonal mirror can scan light at a constant speed onto a photosensitive medium, for example, onto a surface of a photosensitive drum, of an image forming apparatus.

However, because the rotating polygonal mirror and a motor for rotating the rotating polygonal mirror are required, the light scanning systems are increased in size and are susceptible to vibration and noise.

An attempt has been made to use a sinusoidally vibrating light deflector as a light deflector.

Japanese Patent Laid-open Publication No. hei 9-33843 (published on Feb. 7, 1997) discloses a light scanning system including a sinusoidally vibrating light deflector. The angle of light, which is reflected by the sinusoidally vibrating light deflector, incident on an image-forming lens varies with time according to a trigonometric function.

Accordingly, in this case, an f-arcsin θ lens is used as an image-forming lens.

The light scanning system employing the sinusoidally vibrating light deflector has advantages of low power consumption, a compact light deflector structure, no metal fatigue, and high durability. However, the structure of the f-arcsin θ lens that is used as the image-forming lens is complex, leading to an obstacle to system miniaturization and cost reduction.

Accordingly, a need exists for a light scanning system having an improved sinusoidally vibrating light deflector.

SUMMARY OF THE INVENTION

The exemplary embodiments of the present invention provide a light scanning system using a sinusoidally vibrating light deflector while not using an f-arcsin θ lens as an image-forming lens, and an image forming apparatus employing the light scanning system.

According to an aspect of the present invention, a light scanning system comprises a light source unit emitting light, and a light deflector having a sinusoidally vibrating deflecting surface that deflects and scans the light emitted from the light source unit. When the deflecting surface is positioned to direct light to the center of a scan range, the maximum deflection angle $\Phi_0$ of the deflecting surface satisfies $20° \leq \Phi_0 \leq 25°$.

The light scanning system may further comprise a focusing lens system including at least one lens for focusing the light deflected and scanned by the light deflector on a surface that is to be scanned.

The distance between the deflecting surface of the light deflector and the focusing lens system may be within 10% of the distance between the deflecting surface and the to-be-scanned surface.

The focusing lens system may be rotationally symmetric about an optical axis.

The light scanning system may further comprise a focusing lens system disposed between the light source unit and the deflecting surface for focusing light, wherein post-objective scanning is performed.

The light deflector may comprise a sinusoidally vibrating micro-electro-mechanical system (MEMS) device.

A maximum scan angle $\theta_0$ with respect to the center of the scan range may satisfy $\theta_0 \leq 1.5 \Phi_0$.

According to another aspect of the present invention, an image forming apparatus comprises the light scanning system scanning light, and a photosensitive medium on which an electrostatic latent image is formed using the light scanned by the light scanning system.

Other objects, advantages and salient features of the invention will become apparent from the following detailed description, which, taken in conjunction with the annexed drawings, discloses exemplary embodiments of the invention.

BRIEF DESCRIPTION OF THE DRAWINGS

The above and other features and advantages of the present invention will become more apparent by describing in detail exemplary embodiments thereof with reference to the attached drawings, in which.

Throughout the drawings, like reference numerals will be understood to refer to like parts, components and structures.

DETAILED DESCRIPTION OF EXEMPLARY EMBODIMENTS

The present invention is described more fully with reference to the accompanying drawings, in which exemplary embodiments of the invention are shown.

Figure 1:
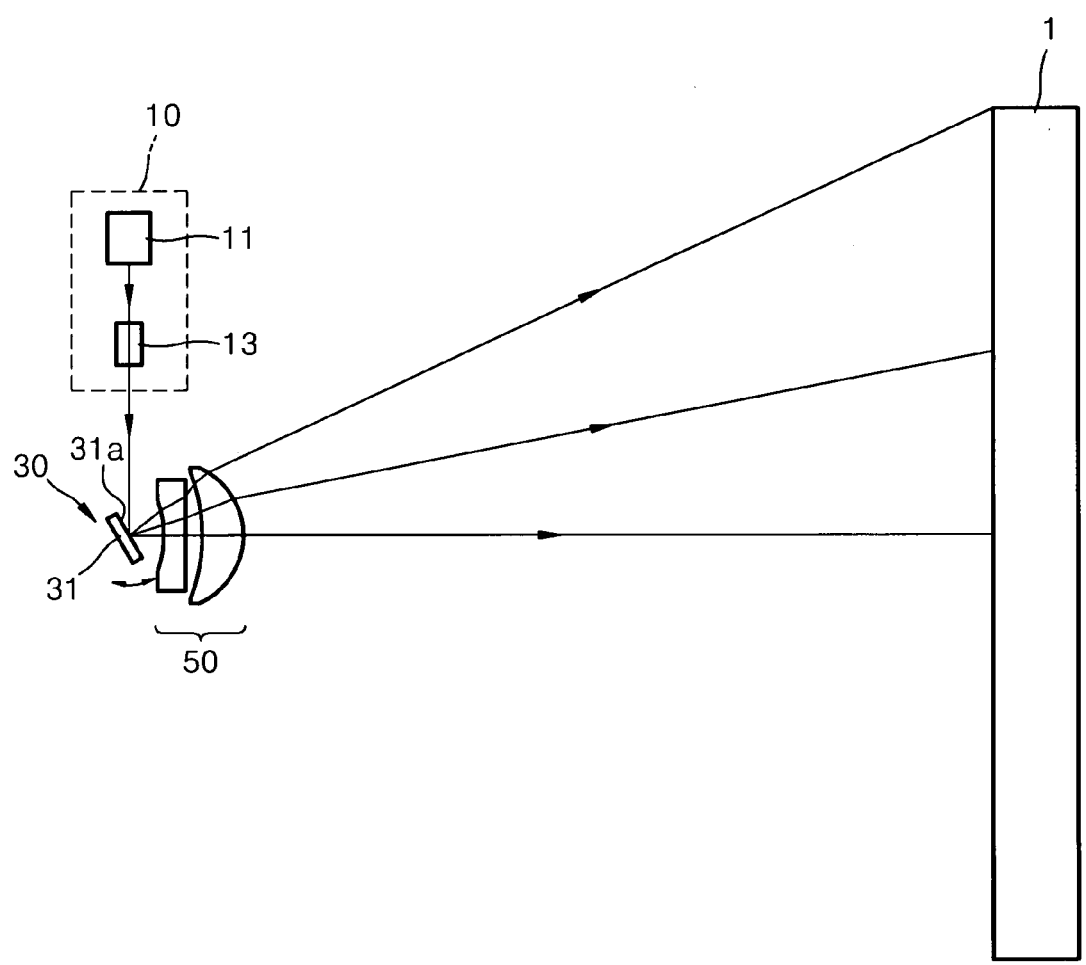
FIG. 1 is a top plan view illustrating the optical arrangement of a light scanning system according to an exemplary embodiment of the present invention.

FIG. 1 is a plan view illustrating the optical arrangement of a light scanning system according to an exemplary embodiment of the present invention.

Referring to FIG. 1, the light scanning system includes a light source unit 10 emitting light, and a light deflector 30 deflecting the light emitted from the light source unit 10. The light scanning system may further include a focusing lens system 50 focusing the light deflected by the light deflector 30 on a surface that is to be scanned (referred to as a to-be-scanned surface).

The light source unit 10 may include a light source 11 emitting light and a collimating lens 13 collimating the light emitted from the light source 11.

The light source 11 is modulated to selectively emit light to only a portion of a photosensitive medium 1 of an image forming apparatus where an electrostatic latent image is to be formed. The light source 11 may be a semiconductor laser. The light source 11 may be a single light source that emits a single beam, or include a plurality of light sources 11 that emit multiple beams.

The light deflector 30 deflects and scans a beam emitted from the light source 11 in a main scanning direction of the photosensitive medium 1.

The light deflector 30 deflects and scans a beam, which is emitted from the light source 11 to a deflecting surface 31a of a deflecting mirror 31, in the main scanning direction of the photosensitive medium 1 by sinusoidally vibrating the deflecting mirror 31. The light deflector 30 may be a sinusoidally vibrating micro-electro-mechanical system (MEMS) device. The MEMS device used as the light deflector 30 includes a micro mirror, and a driving unit (not shown) that sinusoidally vibrates the micro mirror. The micro mirror is the deflecting mirror 31, and a surface of the micro mirror is the deflecting surface 31a. When the deflecting mirror 31 sinuousodally vibrates, the deflecting surface 31a sinusoidally vibrates too.

Figure 2:
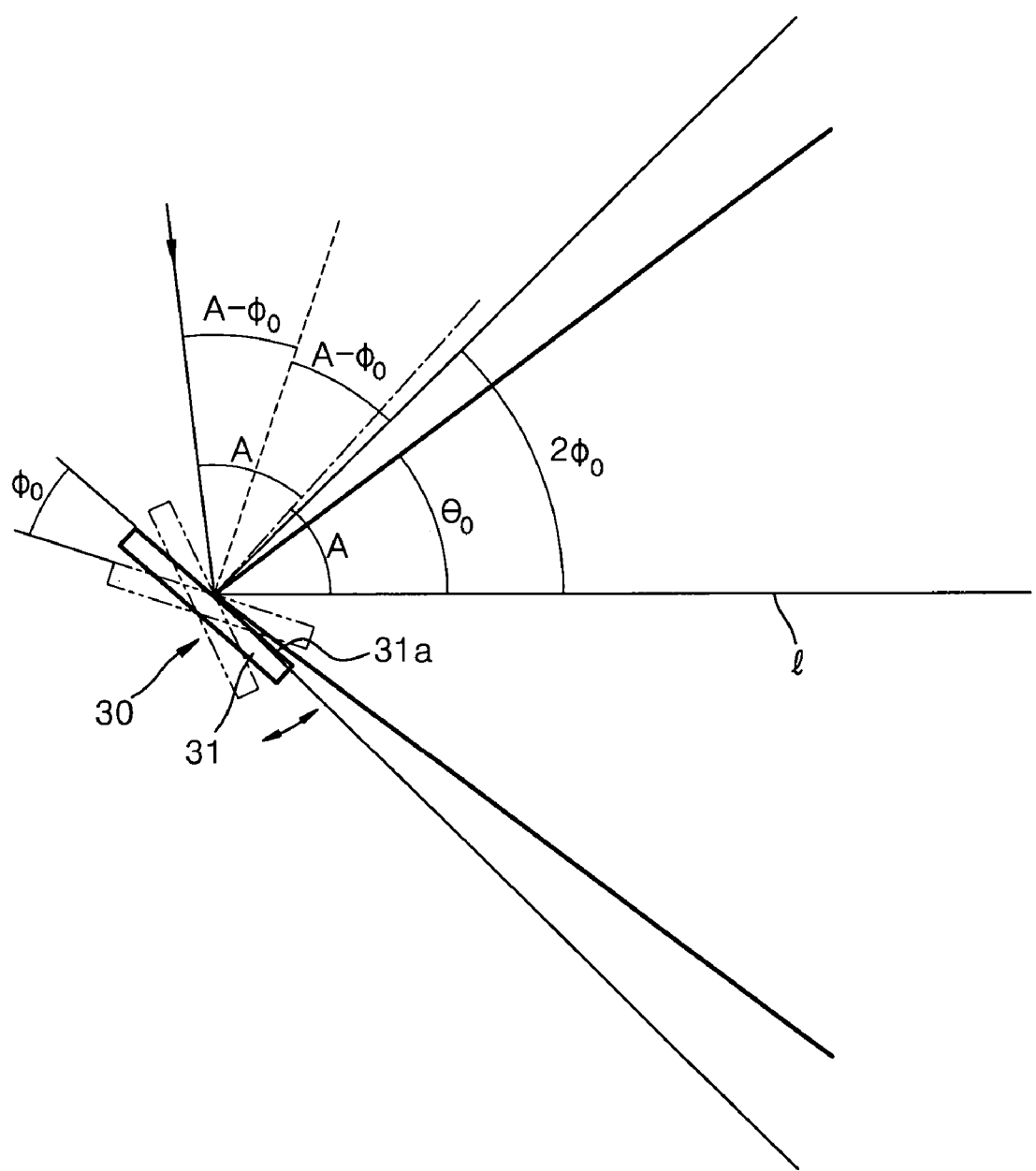
FIG. 2 is a view illustrating the maximum deflection angle and scan angle of a sinusoidally vibrating deflecting surface.

FIG. 2 is a view illustrating the maximum deflection angle and scan angle of the sinusoidally vibrating deflecting surface 31a. Referring to FIG. 2, l denotes a central axis at the center of a scan range, and the deflecting mirror 31 represented by a solid line has the deflecting surface 31a positioned to direct light to the center of the scan range. The center of the scan range corresponds to the center of an effective scan line width that is formed when light is scanned in the main scanning direction onto the to-be-scanned surface, for example, the center of an effective photosensitive area of the photosensitive medium 1.

When the deflecting surface 31a of the light deflector 30 is positioned to direct light to the center of the scan range, the maximum deflection angle $\Phi_0$ of the deflecting surface 31a may satisfy $$20° \leq \Phi_0 \leq 25° \quad (1).$$

When the maximum deflection angle is $\Phi_0$, because the deflecting surface 31 periodically sinusoidally vibrates in the range of $-\Phi_0$ to $+\Phi_0$, the total range of the maximum deflection angle of the deflecting surface 31a of the light deflector 30 becomes $2\Phi_0$.

When the light deflecting surface 31a is positioned to direct light deflected and scanned thereby to the central axis l at the center of the scan range in FIG. 2 and light is incident at an angle A on the light deflecting surface 31a, the light is reflected at an angle A by the deflecting surface 31a to the central axis l. Accordingly, the total angular range of the incident light and the reflected light (deflected light) is 2A.

When the deflecting surface 31a is pivoted by $\Phi_0$, light is incident at an angle $A-\Phi_0$ on the deflecting surface 31a, and thus the total angular range of the incident light and reflected light is $2(A-\Phi_0)$.

It is assumed that when the deflecting surface 31a is positioned to reflect and direct light to the central axis l at the center of the scan range, central light of the light is first light, and when the deflecting surface 31a is pivoted by $\Phi_0$ to reflect light, central light of the light is second light. The angle between the first light and the second light is $2A-2(A-\Phi_0)=2\Phi_0$.

That is, when the deflecting surface 31a is pivoted by $\Phi_0$, light is scanned in the scan angle range $2\Phi_0$. Because the deflecting surface 31a sinusoidally vibrates in the range of $+\Phi_0$ to $-\Phi_0$ when the deflecting surface 31a is positioned to direct light to the center of the scan range, light is scanned in the total scan angle range of $-2\Phi_0$ to $+2\Phi_0$, that is, $4\Phi_0$.

In the light scanning system of the present exemplary embodiment and an image forming apparatus employing the same, when the effective maximum scan angle of light focused on the to-be-scanned surface with respect to the central optical axis l at the center of the scan range is $\theta_0$, the maximum scan angle $\theta_0$ may satisfy $$\theta_0 \leq 1.5\Phi_0 \quad (2)$$

Because the deflecting surface 31a sinusoidally vibrates in the range of $+\Phi_0$ to $-\Phi_0$ when the deflecting surface 31a is positioned to direct light to the center of the scan range, the total range of the maximum scan angle of light focused on the to-be-scanned surface is $20\theta_0$.

The maximum deflection angle $\Phi_0$ of the deflecting surface 31a should satisfy Inequality 1 and the maximum scan angle $\theta_0$ should satisfy Inequality 2 for the following reasons.

As is well known, the scan angle $\theta$ of light reflected by the sinusoidally vibrating deflecting surface 31a is given by a sine function of time as follows.

$$\theta = \sin \omega t \quad (3).$$

An image height when main light of light scanned at the scan angle given by the sine function reaches the to-be-scanned surface perpendicular to the optical axis is given by a tangent function again. Accordingly, when the main light of the light reflected by the sinusoidally vibrating deflecting surface 31a reaches the to-be-scanned surface perpendicular to the optical axis, if the distance between the deflecting surface 31a and the to-be-scanned surface s is f, the image height may be given by $$y = f \tan(\sin \omega t) \quad (4).$$

Figure 3A:
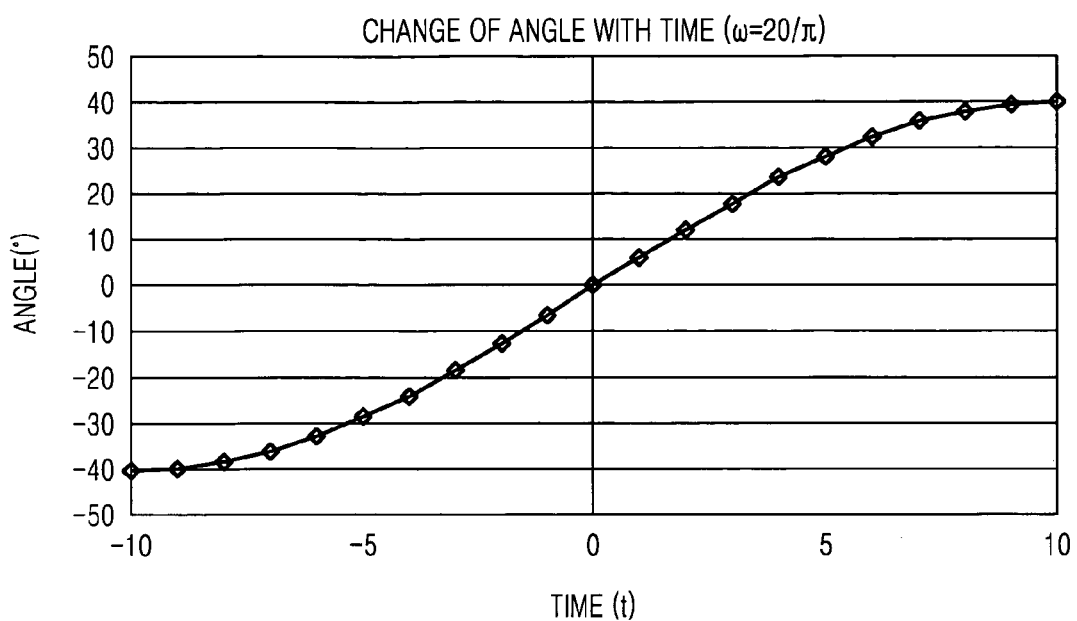
FIG. 3A is an angle versus time graph illustrating that the scan angle of light reflected by the sinusoidally vibrating deflecting surface varies with time in a sinusoidal manner.
Figure 3B:
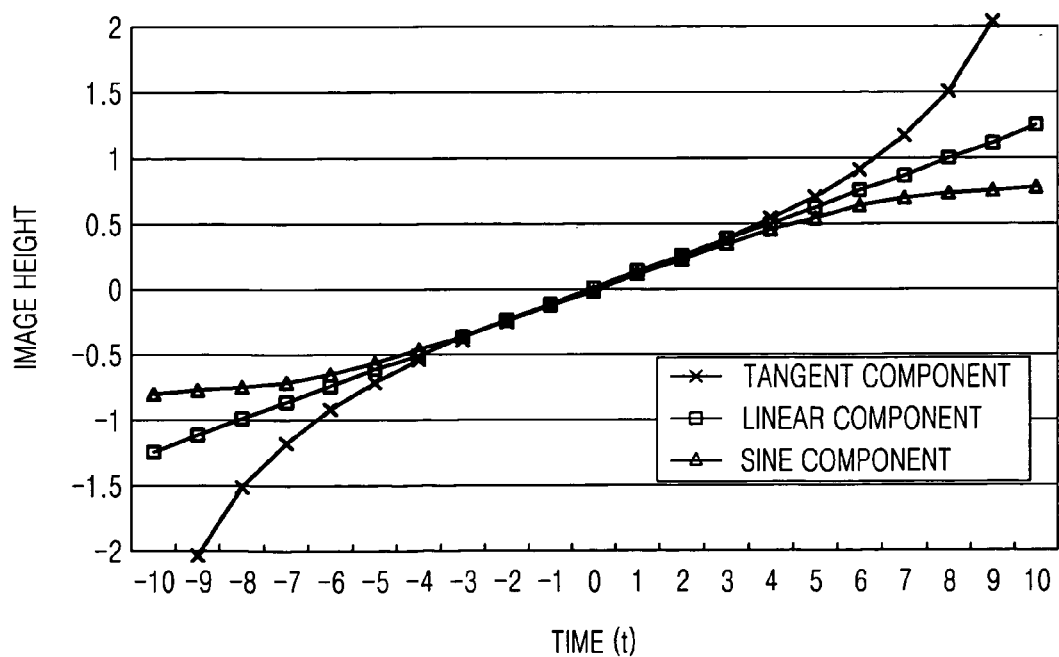
FIG. 3B is an image height versus time graph for a sine component, a tangent component, and a linear component of light scanned by the sinusoidally vibrating deflecting surface.

A sine component decreases in width as the image height increases as shown in FIG. 3A, whereas a tangent component increases in width as the image height increases as shown in FIG. 3B. Accordingly, when the maximum deflection angle of the sinusodially vibrating deflecting surface 31a becomes a predetermined angle, the sine component and the tangent component are compensated by each other, thereby achieving linearity for a specific time interval.

FIG. 3B is an image height versus time graph for the sine, tangent, and linear components of the light scanned by the sinusoidally vibrating deflecting surface 31a. When the maximum deflection angle of the sinusoidally vibrating deflecting surface 31a is within a predetermined range, the sine component and the tangent component are compensated by each other, thereby achieving linearity during a specific time interval.

Figure 4:
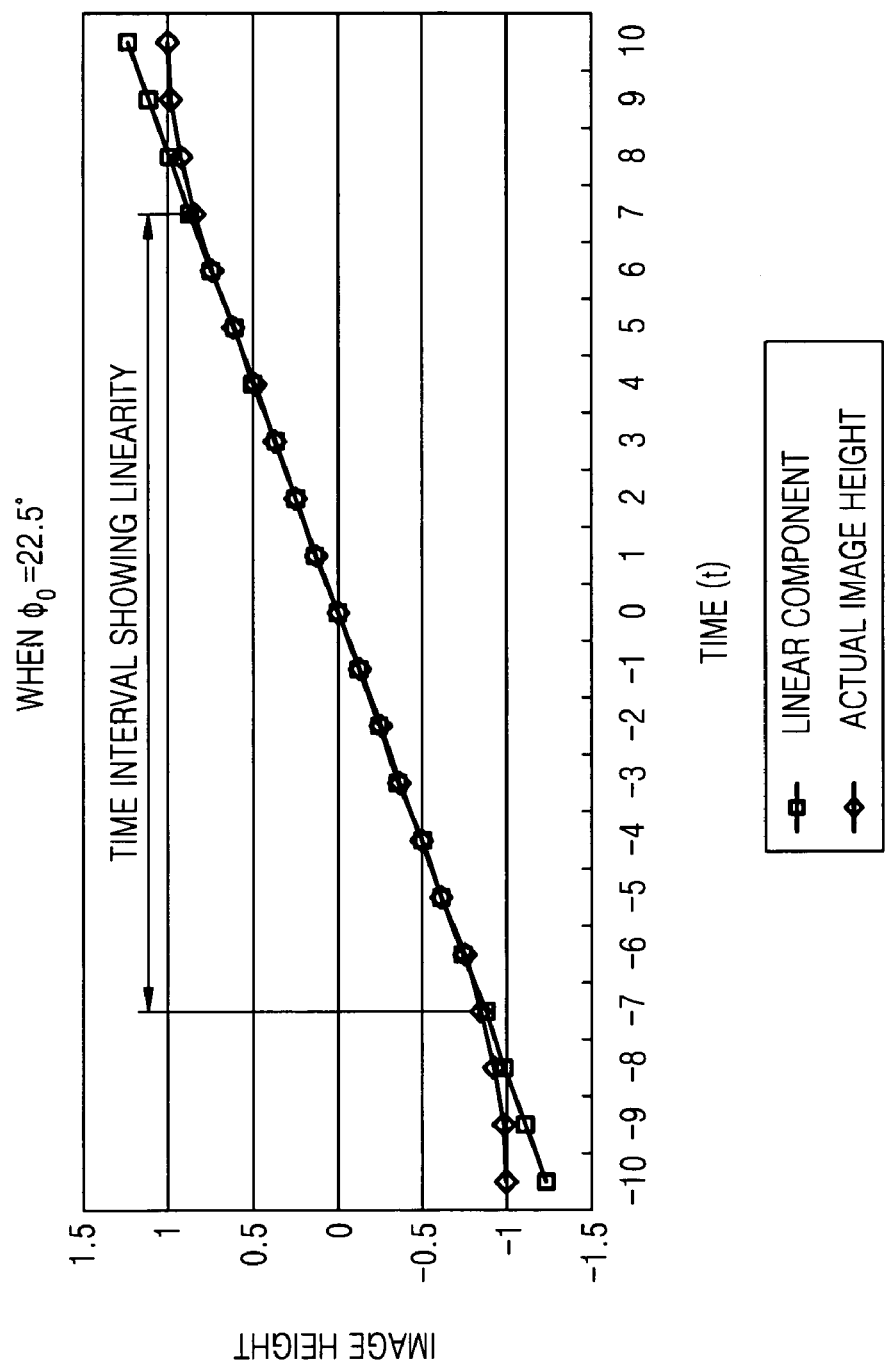
FIG. 4 is an image height versus time graph illustrating that when the deflecting surface sinusoidally vibrates at a maximum deflection angle $\Phi_0$ of 22.5°, the image height versus time graph is linear during a time interval corresponding to about 70%.

FIG. 4 is an image height versus time graph illustrating that when the deflecting surface 31a sinusoidally vibrates at a maximum deflection angle $\Phi_0$ of 22.5° and a scan angle $2\Phi_0$ of 45°, the image height versus time graph is linear during a time interval corresponding to about 70%.

A linearity error during the time interval is about ±1.7% as shown in Table 1.

Accordingly, the light scanning system of the present exemplary embodiment that limits the maximum deflection angle of the deflecting surface 31a to Inequality 1 may use the sinusoidally vibrating light deflector 30 while not using the f-arcsin θ lens as an image-forming lens.

Figure 6:
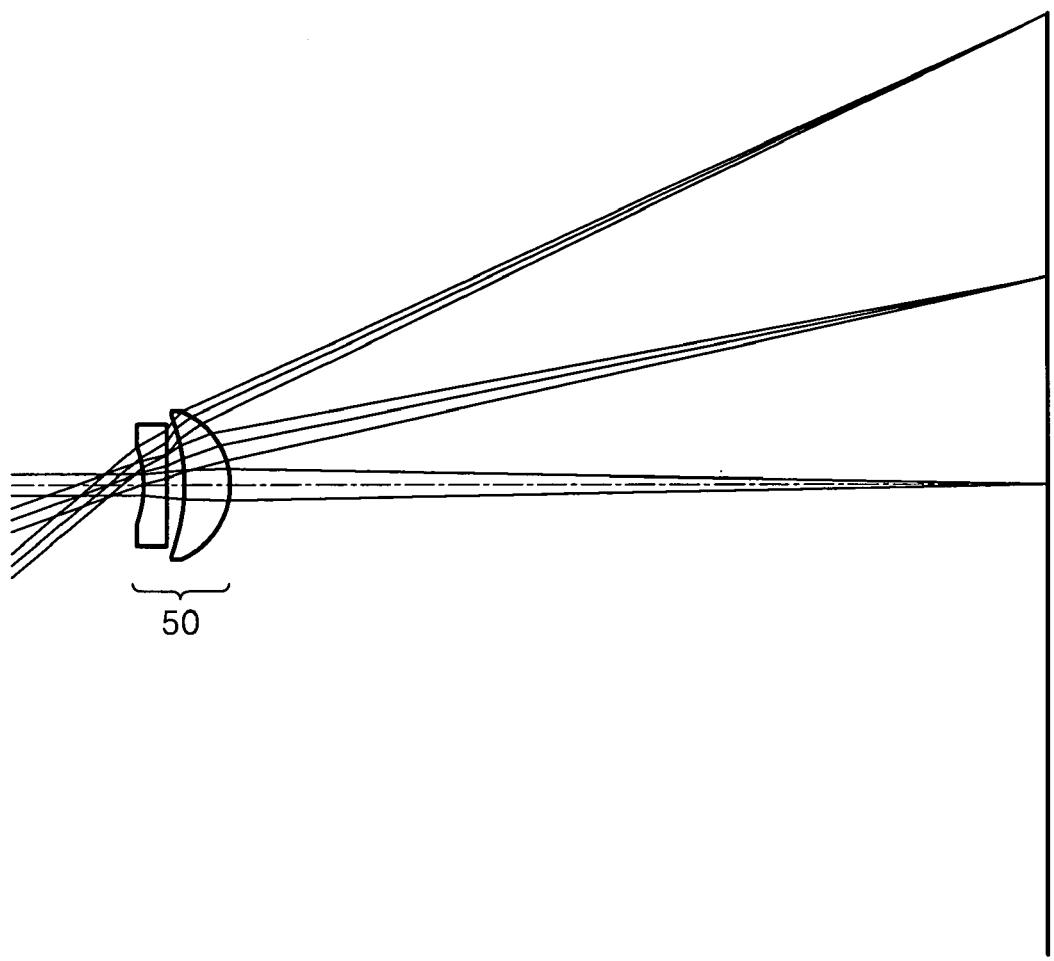
FIG. 6 is a top plan view illustrating the path of light focused by a focusing lens system disposed between a light deflector and a surface that is to be scanned.
Figure 7:
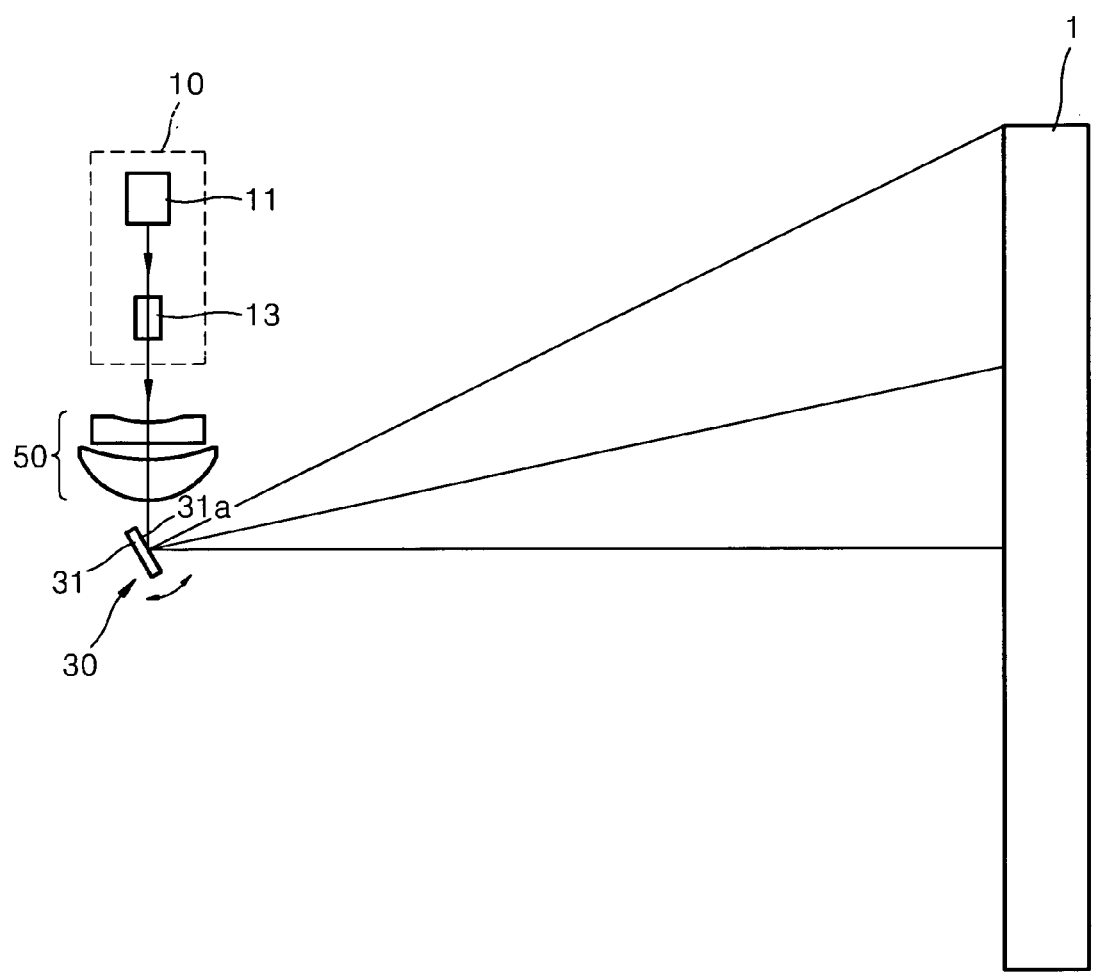
FIG. 7 is a top plan view illustrating the optical arrangement of a light scanning system according to another exemplary embodiment of the present invention, wherein a focusing lens system is disposed between a light source and a light deflector and post-objective scanning is performed.

Meanwhile, the light scanning system of the present exemplary embodiment may further include the focusing lens system 50 focusing light deflected and scanned by the sinusoidally vibrating light deflector 30 on the to-be-scanned surface, that is, the photosensitive surface of the photosensitive drum 1. The focusing lens system 50 may include a single lens, or two or more lenses. FIGS. 1, 6, and 7 illustrate that the focusing lens system 50 including two lenses.

The light scanning system of the present exemplary embodiment may ensure linearity on the to-be-scanned surface per time even when including the focusing lens system 50 that mainly functions to focus light scanned by the light deflector 30.

According to the light scanning system of exemplary embodiments of the present invention, a difference in a scan distance to time ratio between with and without the focusing lens system 50 is within about ±5%.

FIG. 1 illustrates that the focusing lens system 50 is disposed between the light deflector 30 and the to-be-scanned surface. FIG. 6 is a plan view illustrating the path of light focused by the focusing lens system 50 disposed between the light deflector 30 and the to-be-scanned surface. Because the

TABLE 1

| | Time(t) | | | | | | | | | |
|---|---|---|---|---|---|---|---|---|---|---|
| | −7 | −6.3 | −5.6 | −4.9 | −4.2 | −3.5 | −2.8 | −2.1 | −1.4 | −0.7 | 0 |
| Linearity error | −1.7 | −0.03 | 0.998 | 1.528 | 1.702 | 1.648 | 1.469 | 1.25 | 1.052 | 0.917 | −1.7 |

| | Time(t) | | | | | | | | | |
|---|---|---|---|---|---|---|---|---|---|---|
| | 0.7 | 1.4 | 2.1 | 2.8 | 3.5 | 4.2 | 4.9 | 5.6 | 6.3 | 7 |
| Linearity error | 0.917 | 1.052 | 1.25 | 1.469 | 1.648 | 1.702 | 1.528 | 0.998 | −0.03 | −1.7 |

Figure 5A:
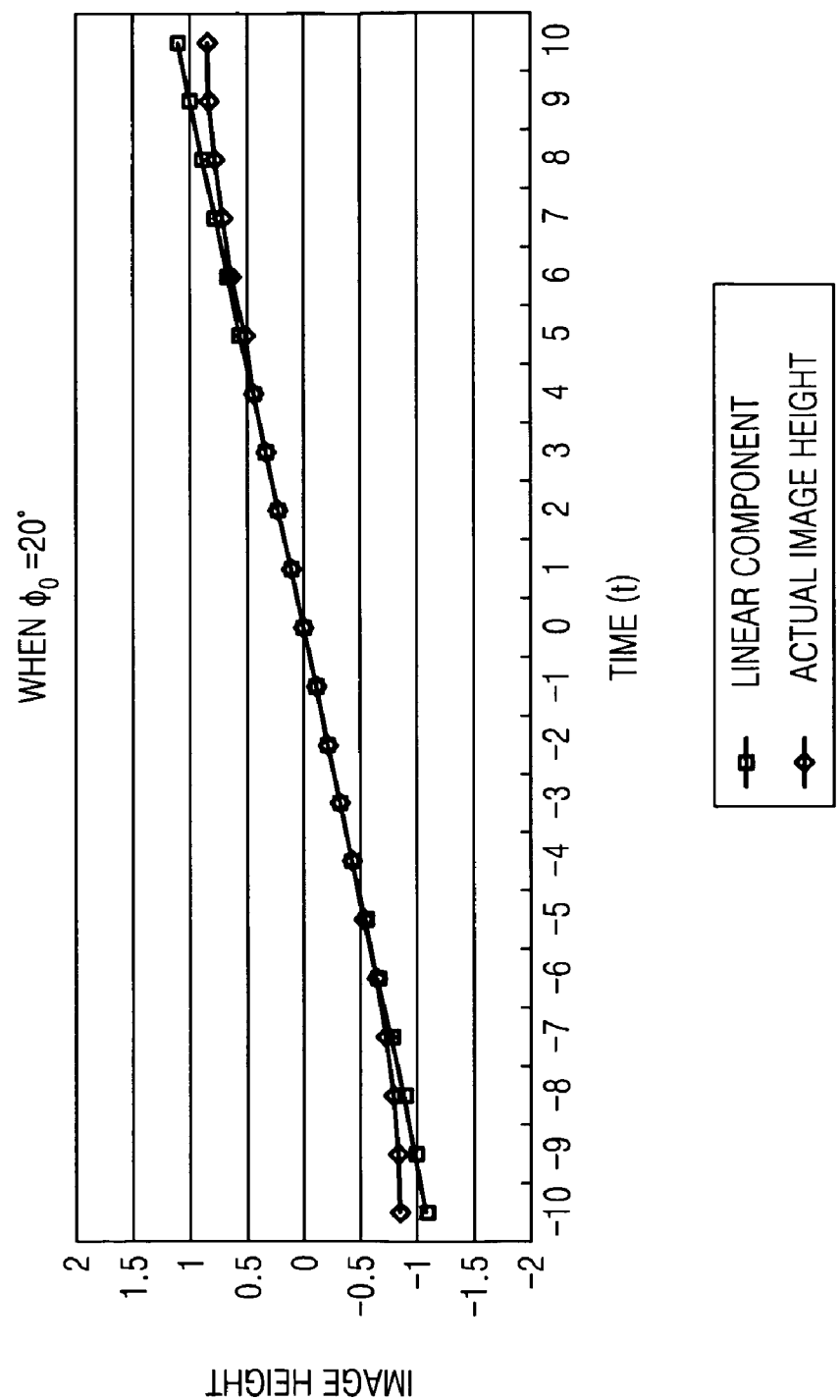
FIG. 5A is an image height versus time graph illustrating that when the deflecting surface sinusoidally vibrates at a maximum deflection angle $\Phi_0$ of 20°, the image height versus time graph is linear during a time interval corresponding to about 60%.
Figure 5B:
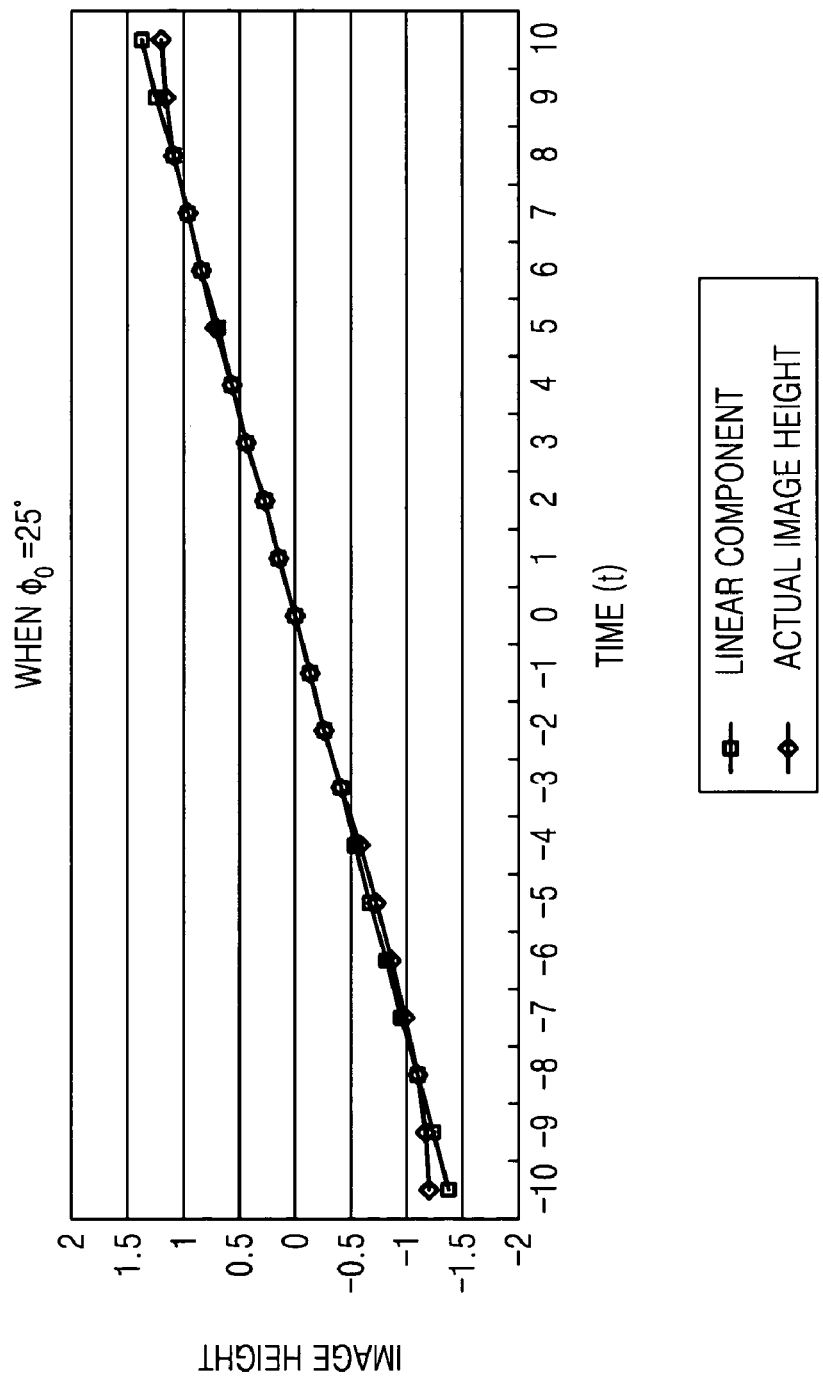
FIG. 5B is an image height versus time graph illustrating that when the deflecting surface sinusoidally vibrates at a maximum deflection angle $\Phi_0$ of 25°, the image height versus time graph is linear during a time interval corresponding to about 80%.

FIG. 5A is an image height versus time graph illustrating that when the deflecting surface sinusoidally vibrates at a maximum deflection angle $\Phi_0$ of 20°, the image height versus time graph is linear during a time interval corresponding to about 60%. FIG. 5B is an image height versus time graph illustrating that when the deflecting surface sinusoidally vibrates at a maximum deflection angle $\Phi_0$ of 25°, the image height versus time graph is linear during a time interval corresponding to about 80%. When the maximum deflection angle $\Phi_0$ satisfies Inequality 1, the image height versus time graph is linear during a time interval greater than about 60%. For the light scanning system of the present exemplary embodiment in which the ratio of a time interval during which the image height versus time graph is linear is greater than 80% or less than 60%, the maximum deflection angle $\Phi_0$ does not have to satisfy Inequality 1.

When light is scanned by sinusodially vibrating the deflecting surface 31a at a maximum deflection angle within a specific range in this way, main light is linear on the to-be-scanned surface, thereby making it unnecessary to dispose an f-arcsin θ lens between the deflecting surface 31a and the to-be-scanned surface and ensuring the linearity of the image height on the to-be-scanned surface.

focusing lens system 50 disposed between the light deflector 30 and the to-be-scanned surface functions to focus light, the focusing lens system 50 amy be disposed close to the light deflector 30 as shown in FIGS. 1 and 6.

For example, the focusing lens system 50 may be disposed so that the distance between the deflecting surface 31a of the light deflector 30 and the focusing lens system 50 is within 10% of the distance between the deflecting surface 31a and the to-be-scanned surface. Because the distance between the deflecting surface 31a and the focusing lens system 50 may be reduced, the light scanning system may be miniaturized and thus the focusing lens system 50 may be configured to be rotationally symmetric about the optical axis. The optical system rotationally symmetric about the optical axis means an optical system including lenses whose sections perpendicular to the centers of the respective lenses are substantially circular.

FIG. 7 is a plan view illustrating the optical arrangement of a light scanning system according to another exemplary embodiment of the present invention, wherein post-objective scanning is performed by disposing the focusing lens system 50 for focusing light between the light source unit 10 and the deflecting surface.

Because the light scanning system of the present exemplary embodiment ensures linearity on the to-be-scanned surface, post-objective scanning may be performed by disposing the focusing lens system 50 with a depth of focus corresponding to a field of curvature between the light source 11 and the deflecting surface 31a, not between the deflecting surface 31a and the to-be-scanned surface.

When the focusing lens system 50 is disposed between the deflecting surface 31a and the light source 11 as shown in FIG. 7, the focusing lens system 50 may be close to the deflecting surface 31a. Accordingly, because the frame of the light scanning system may be reduced and the focusing lens system 50 may be rotationally symmetric, the size of the focusing lens system 50 may be reduced, thereby lowering costs for processing and manufacturing the lenses.

As described above, the maximum deflection angle of the deflecting surface of the sinusoidally vibrating light deflector 30 is limited to the range in which the linearity of the image height on the to-be-scanned surface may be ensured. Accordingly, the light scanning system may use the sinusoidally vibrating light deflector 30 without the f-arcsin θ lens.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A light scanning system, comprising:
a light source unit emitting light; and
a light deflector having a sinusoidally vibrating deflecting surface for deflecting and scanning the light emitted from the light source unit,
wherein when the deflecting surface is positioned to direct light to the center of a scan range, the maximum deflection angle $\Phi_0$ of the deflecting surface satisfies $20° \leq \Phi_0 \leq 25°$.

2. The light scanning system of claim 1, further comprising a focusing lens system including at least one lens for focusing the light deflected and scanned by the light deflector on a surface that is to be scanned.

3. The light scanning system of claim 2, wherein the distance between the deflecting surface of the light deflector and the focusing lens system is within 10% of the distance between the deflecting surface and the to-be-scanned surface.

4. The light scanning system of claim 2, wherein the focusing lens system is rotationally symmetric about an optical axis.

5. The light scanning system of claim 1, further comprising a focusing lens system disposed between the light source unit and the deflecting surface for focusing light for post-objective scanning.

6. The light scanning system of claim 1, wherein the light deflector comprises a sinusoidally vibrating micro-electromechanical system (MEMS) device.

7. The light scanning system of claim 6, wherein a maximum scan angle $\theta_0$ with respect to the center of the scan range satisfies $\theta_0 \leq 1.5\Phi_0$.

8. The light scanning system of claim 1, wherein a maximum scan angle $\theta_0$ with respect to the center of the scan range satisfies $\theta_0 \leq 1.5\Phi_0$.

9. The light scanning system of claim 6, wherein the distance between the deflecting surface of the light deflector and the focusing lens system is within 10% of the distance between the deflecting surface and the to-be-scanned surface.

10. The light scanning system of claim 6, wherein the focusing lens system is rotationally symmetric about an optical axis.

11. An image forming apparatus, comprising:
a light scanning system including a light source unit emitting light; and
a light deflector having a sinusoidally vibrating deflecting surface for deflecting and scanning the light emitted from the light source unit, such that when the deflecting surface is positioned to direct light to the center of a scan range, the maximum deflection angle $\Phi_0$ of the deflecting surface satisfies $20° \leq \Phi_0 \leq 25°$; and
a photosensitive medium on which an electrostatic latent image is formed using the light scanned by the light scanning system.

12. The image forming apparatus of claim 11, further comprising a focusing lens system including at least one lens for focusing light deflected and scanned by the light deflector on a surface that is to be scanned.

13. The image forming apparatus of claim 12, wherein the distance between the deflecting surface of the light deflector and the focusing lens system is within 10% of the distance between the deflecting surface and the to-be-scanned surface.

14. The image forming apparatus of claim 12, wherein the focusing lens system is rotationally symmetric about an optical axis.

15. The image forming apparatus of claim 11, further comprising a focusing lens system disposed between the light source unit and the deflecting surface for focusing light for post-objective scanning.

16. The image forming apparatus of claim 11, wherein the light deflector comprises a sinusoidally vibrating MEMS device.

17. The image forming apparatus of claim 16, wherein a maximum scan angle $\theta_0$ with respect to the center of the scan range satisfies $\theta_0 \leq 1.5\Phi_0$.

18. The image forming apparatus of claim 11, wherein a maximum scan angle $\theta_0$ with respect to the center of the scan range satisfies $\theta_0 \leq 1.5\Phi_0$.

19. The light scanning system of claim 15, wherein the distance between the deflecting surface of the light deflector and the focusing lens system is within 10% of the distance between the deflecting surface and the to-be-scanned surface.

20. The light scanning system of claim 15, wherein the focusing lens system is rotationally symmetric about an optical axis.

* * * * *